Feb. 4, 1958 W. C. BAKER 2,821,864
TRANSMISSION
Original Filed Jan. 24, 1952 3 Sheets-Sheet 1

INVENTOR.
WILLARD C. BAKER
BY
ATTORNEY

Feb. 4, 1958 W. C. BAKER 2,821,864
TRANSMISSION
Original Filed Jan. 24, 1952 3 Sheets-Sheet 2

INVENTOR.
WILLARD C. BAKER
BY
ATTORNEY

Feb. 4, 1958     W. C. BAKER     2,821,864
TRANSMISSION

Original Filed Jan. 24, 1952     3 Sheets-Sheet 3

INVENTOR.
WILLARD C. BAKER
BY
ATTORNEY

United States Patent Office 2,821,864
Patented Feb. 4, 1958

2,821,864

TRANSMISSION

Willard C. Baker, Plymouth, Mich., assignor to Jered Industries, Inc., Hazel Park, Mich., a corporation of Michigan Original application January 24, 1952, Serial No. 268,043, now Patent No. 2,687,652, dated August 31, 1954. Divided and this application August 18, 1954, Serial No. 450,574

3 Claims. (Cl. 74—378)

My present invention relates generally to power transmitting mechanisms and more particularly to a new and improved power transmission adapted to provide a plurality of geared power flow paths for drivably connecting a driving power input member and a driven power output member.

This application forms a division of my copending application, Serial No. 268,043, filed January 24, 1952, which issued on August 31, 1954, as U. S. Patent No. 2,687,652.

The provision of a transmission of the type referred to above being a principal object of my invention, another object of my invention is to provide a means for reducing the gear teeth loads on the individual gears of the transmission.

A further object of my invention is to provide a power transmission of the type referred to above wherein the bearing loads caused by unbalanced separating forces for the individual transmission gears and by unbalanced tangential gear tooth forces are substantially eliminated.

A more specific object of my invention is to provide a power transmitting mechanism for delivering power from a driving member to a driven member wherein first and second gears are connected to the driving member and the driven member, respectively, and in which intermediate gears individually engage each of the first and second gears to provide a multiple power flow path between the driving and driven members.

It is another object of my invention to provide a power transmitting mechanism according to the preceding objects in which one of a plurality of gears of a closed gear train is mounted to provide for a floating movement of the same with respect to the other gears.

In carrying forth the foregoing objects, I have provided a transmission assembly having a housing within which is rotatably mounted a pair of juxtaposed idling gears, said gears being adapted to be selectively clutched to a concentrically mounted cross shaft. A power input pinion is drivably engaged with each of the aforementioned idling gears and is operatively connected by means of a double universal joint, or the like, to a transmission power input shaft. This power input pinion may be mounted upon an arm of a yoke member which encircles the transverse cross shaft. The yoke may be adapted to be rotatably oscillated within the housing thereby permitting the power input pinion to move in a direction substantially transverse to its central axis.

A power output gear is also drivably engaged with each of the two idler gears and is rotatably mounted in a juxtaposed position with respect to the power input pinion.

During the operation of the transmission, the power output pinion is permitted to automatically adjust itself so that compensation takes place for the backlash which exists in the closed gear path. Thus, two paths are provided for the delivery of power from the driving power input member to the power output member, each of the idler gears respectively forming a portion of one of the paths.

In the presently disclosed embodiment of the invention, the power input pinion may be more conveniently mounted in the above-described novel manner than any of the other gears. However, a mere matter of design would be required to so mount one or more of the other gears while the power input pinion is rotatably mounted in a fixed position.

In my copending application, above mentioned, I have disclosed a means for selectively clutching either of the intermediate gears to the cross shaft which is disposed perpendicularly to the power input shaft. The above-mentioned intermediate gears function as power output gears in this instance, the above-mentioned power output gear and the de-clutched intermediate gear functioning as idler gears to provide a second power flow path from the input shaft to the output shaft.

For the purpose of more particularly describing my instant invention, reference will be made to the accompanying drawings wherein.

Figure 1:
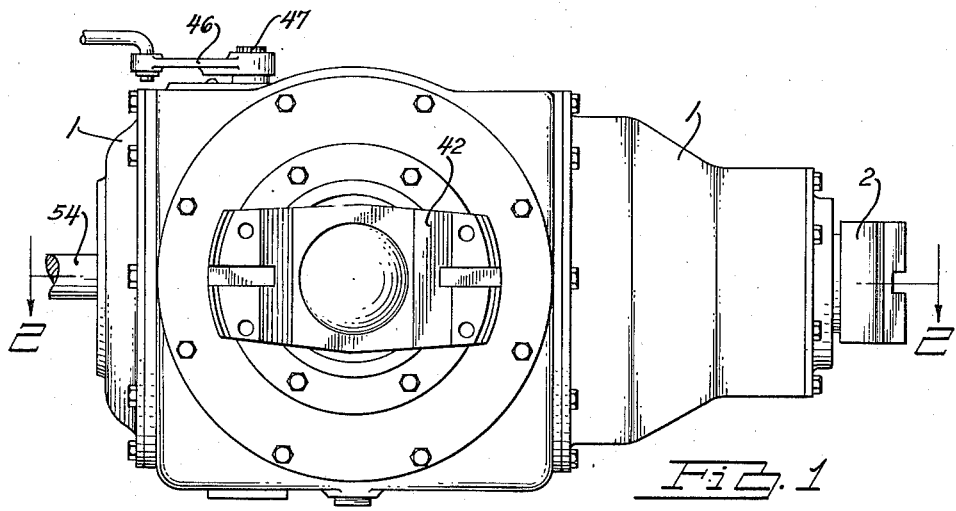
Figure 1 is a side view of the right angle drive transmission showing the outside of the housing.
Figure 2:
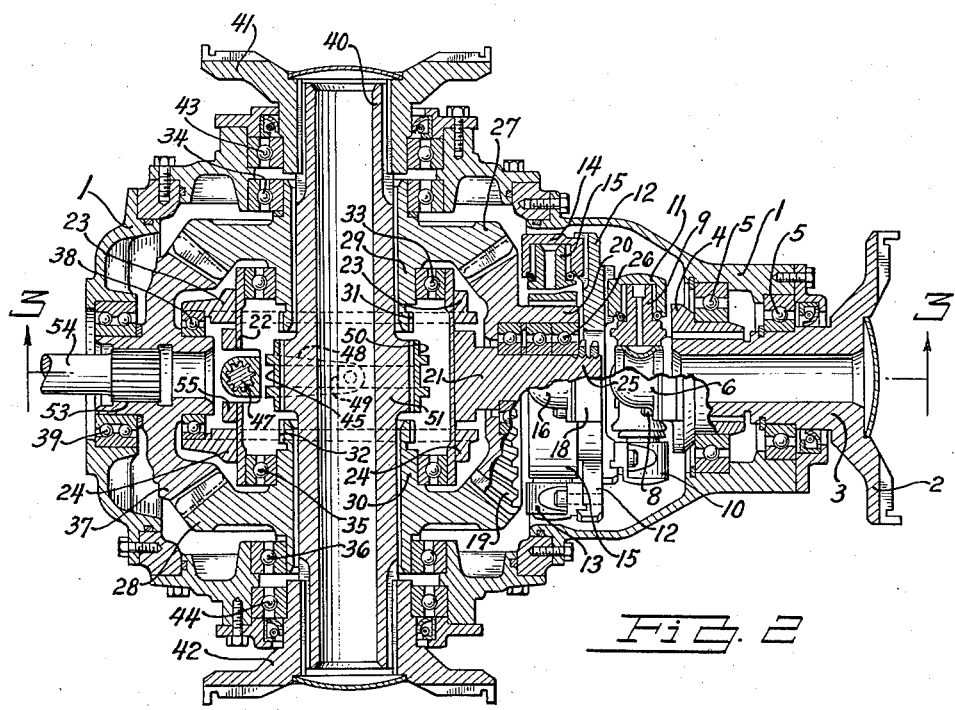
Figure 2 is a horizontal sectional view of the transmission taken on the line 2—2 of Figure 1 with part shown in elevation.
Figure 3:
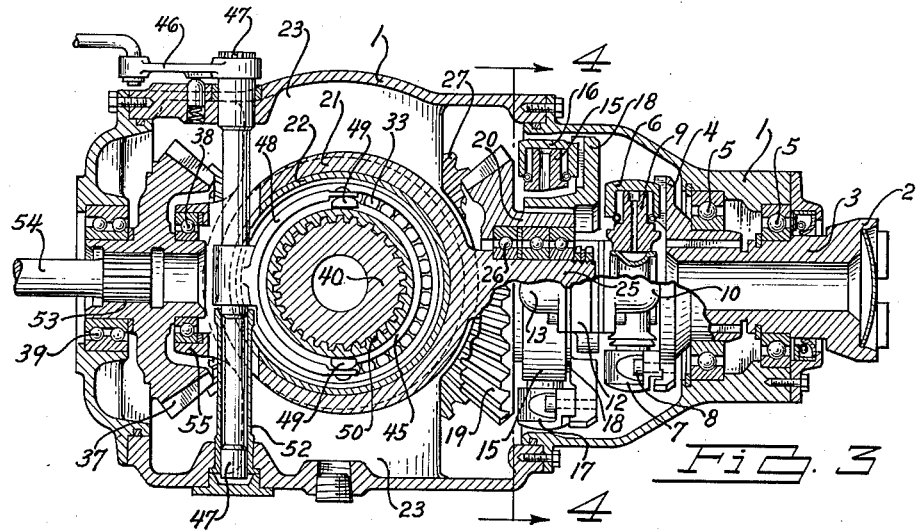
Figure 3 is a vertical sectional view of the transmission taken on the line 3—3 of Figure 2 together with part shown in elevation.
Figure 4:
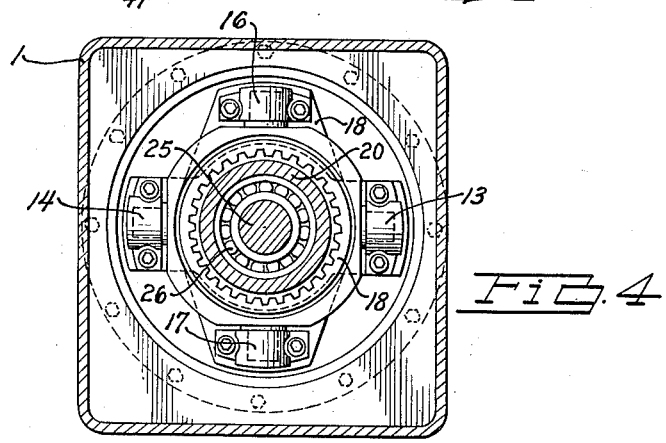
Figure 4 is a transverse sectional view taken on line 4—4 of Figure 3.

Referring first to Figures 1, 2 and 3, the transmission housing is generally designated by means of numeral 1. A power input flange 2 may be integrally formed on one end of a power input shaft 3, as shown. Flange 2 may be drivably coupled to a suitable power shaft or drive shaft, not shown. The power input shaft 3 is splined to the end hub 4 of a double universal joint coupling which may best be viewed in Figures 2 and 3. The input shaft 3 is rotatably mounted within an end portion of the housing 1 by means of suitable bearings 5.

The end hub 4 is bolted securely by means of bolts 8 to universal joint caps 6 and 7 which are mounted upon a diametrically opposed pair of the four equally spaced radial studs on the universal joint spider member 9. The caps 6 and 7 are free to undergo angular movement about the axis of the studs upon which they are mounted. Another pair of caps 10 and 11 are similarly mounted on the two remaining studs of the spider member 9, as shown.

Caps 10 and 11 may be securely bolted to a universal joint centerplate 12 which provides a support upon which other universal joint caps 13 and 14 are bolted. Caps 13 and 14 are situated on one face of the centerplate 12 while the caps 10 and 11 are situated on the opposite face.

The caps 13 and 14 are rotatably mounted on two diametrically opposed radial studs which are integral with a second spider member 15. Like the previously described universal joint caps 6, 7, 9, and 10, the caps 13 and 14 are free to undergo angular deflection with respect to the axis of the studs upon which they are mounted. The two remaining studs of the spider member 15 are adapted to rotatably support another pair of universal joint caps 16 and 17 which in turn are bolted securely to an adaptor plate shown at 18. This adaptor plate 18 has a central hub which is internally splined to an extended hub 20 of the input bevel gear 19. The bevel gear 19, adaptor plate 18, and caps 16 and 17 thus comprise a unitary, rotatable assembly.

The input bevel gear 19 is free to move in a vertical plane while simultaneously rotating about its own axis. It is possible for the axis of the input shaft to form an angle with respect to a horizontal reference line which is of a different magnitude than the angle formed by the axis of the input bevel gear 19 with the same reference line. Further, it is not necessary that the axis of the input bevel gear 19 and the axis of the input shaft 3 should intersect. Because of the freedom of motion of this input bevel gear, it may be appropriately termed a "floating" pinion.

A yoke is shown at 21 and it is slidably supported by a cylindrical shell 22 which in turn is supported by parallel web portions 23 and 24. These web portions form extensions of the outer housing casting 1 and are integral with the same. In this presently disclosed embodiment, the shell 22 is secured to the two web portions 23 and 24 by means of a press fit. As best seen in Figure 2, the yoke 21 includes an extended arm 25 upon which the input bevel gear 19 is rotatably mounted by means of bearings 26.

As best seen in Figure 2, two idler bevel gears are shown at 27 and 28 which are provided with extended hub portions 29 and 30, respectively. An external spline 31 is formed on one end of the hub portion 29 and a similar external spline 32 is formed on the hub portion 30. The idler gear 27 is rotatably mounted within the housing by means of suitable bearings 33 and 34 located at opposed ends of the hub portion 29. Bearing 33 is backed up and secured by the cylindrical shell 22 which in turn is firmly supported by web portions 23 and 24, as previously described. Bearing 34 is backed up by and secured within the outer housing casting 1, as shown. Idler gear 28 is similarly mounted by means of bearings 35 and 36, bearing 35 being secured by the cylindrical shell 22 and bearing 36 being secured by the outer housing 1.

Figure 6:
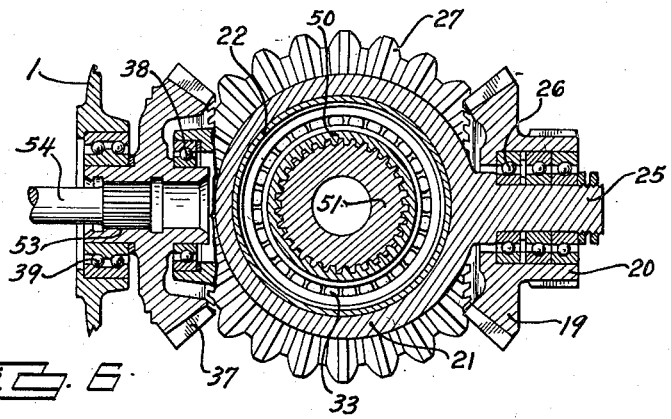
Figure 6 is a partial sectional view showing the relative position of the input bevel gear.

A power output bevel gear is shown at 37 in Figures 2, 3, and 6, said bevel gear 37 being drivably engaged by the two idler gears 27 and 28. This output gear 37 is rotatably mounted upon two suitable bearings 38 and 39 situated at either end of a central gear hub on opposed sides of the gear proper. The bearing 38 is secured by the web portions 23 and 24 and the bearing 39 is secured by the transmission housing 1.

A hollow cross shaft 40 may be concentrically mounted with respect to the two idler bevel gears 27 and 28 and it extends through the transmission assembly perpendicularly with respect to the power input shaft 3. Two flanges 41 and 42 may be secured to either end of the cross shaft 40 on the exterior of the transmission housing 1. The sub-assembly consisting of the cross shaft 40 and the two flanges 41 and 42 is end-supported by two axially spaced bearings 43 and 44, which in turn are mounted in the outer housing 1. The two idler bevel gears 27 and 28 are independently revolvable upon the power output shaft 40. Oil seals may be provided as shown at the base of each of the flanges 41 and 42 and also at the base of the power input flange 2 as shown.

As previously described in my copending application, mentioned above, the bevel gears 27 and 28 may be adapted to function as power output gears and are effective to transmit power to the cross shaft 40 and the associated flanges 41 and 42. For the purpose of selectively clutching either of the gears 27 or 28 to the shaft 40, a clutching mechanism is provided. This mechanism has been described in my copending application and it is effective to selectively provide a positive driving engagement between either of the gears 27 or 28 and the shaft 40 when a power absorbing means is coupled to either or both of the flanges 41 and 42. However, this clutching mechanism is not an essential component of my present invention as herein disclosed. I contemplate that the clutching mechanism may be moved to an inoperative or neutral position while carrying out the principles of my instant invention, the gears 27 and 28 thereby being permitted to function solely as idler gears.

Although the clutching mechanism is not presently required, as above mentioned, certain features thereof will be set forth in my instant disclosure for the purpose of providing a more complete description of the transmission structure.

A shifting lever 46 is splined to a rotatable shaft 47 which is positively secured to a shifting fork 42, as best seen in Figure 3. The two extremities of the shifting fork 48 have mounted thereon shoes 49 which are situated inside a peripheral groove 45 located in an internally splined shifter element 50. An intermediate portion 51 of the output shaft 40 is externally splined and is adapted to mesh with the internally splined shifter element 50. Rotary motion may be imparted to the shifting fork 48 and the shaft 47 by the lever 46, the shifter element 50 thereby being moved in either axial direction along the splined intermediate portion 51 of the shaft 40.

A hollow tube 52 is embedded at one end thereof in the housing 1 and it acts as a cantilever support for the shaft 47, the shaft 47 being assembled concentrically with respect to the tube 52. To avoid interference with tube 52, yoke 21 and the cylindrical shell 22 are cut away as shown, to produce a slot 55 through which tube 52 extends.

Figure 5:
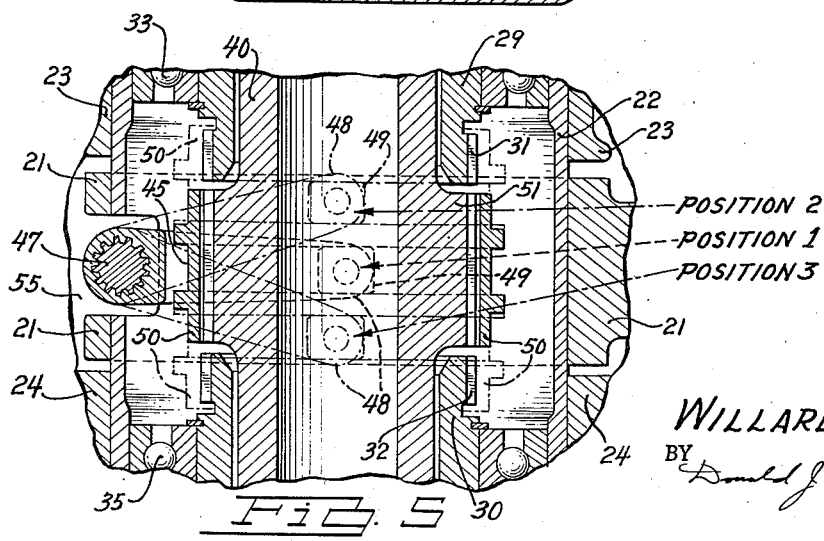
Figure 5 is an enlarged detail sectional view taken on the plane of Figure 2 showing the construction of the clutching mechanism.

As best seen in Figure 5, the shifter element 50 may be moved to either of three operating positions which are identified as position 1, position 2, and position 3. When the shifting fork 48 causes the shifter element 50 to assume position 2, the bevel gear 27 becomes positively clutched to shaft 40 and it functions as a power output gear, the shaft 40 being driven in one direction. When the shifting element is moved to position 3, the bevel gear 28 functions as the power output gear and the shaft 40 is driven in the opposite direction.

I presently contemplate that the bevel gear 37 may function as a power output gear and I have therefore provided the same with an extended hub portion which is internally splined as shown at 53. A suitable externally splined power output shaft 54 may be drivably engaged with this internally splined hub portion of output gear 37.

In the operation of my present invention, the power input bevel gear 19 may be rotated continually in one direction by virtue of the above described closed coupled double universal joint interposed between the power input shaft 3 and the gear 19. It will be assumed that the shifter element 50 is moved by the shifting mechanism to the intermediate or neutral position 1, as shown in Figure 5.

The power input gear 19 is drivably connected to the power output gear 37 by each of the idler gears 27 and 28.

A backlash normally exists between each of the meshing gears and the magnitude of this backlash may vary between certain predetermined manufacturing tolerances. Accordingly, it is practically impossible to design the gears of the transmission so that the sum of the backlash between gears 19 and 27 and between gears 27 and 37 will be exactly equal to the sum of the backlash between gears 19 and 28 and between gears 28 and 37. Compensation is made for this inequality by the floating characteristic of the power input gear 19.

For the purpose of more particularly describing the operation of my instant invention, it will first be assumed that the power input gear is rotatably mounted in a fixed position. The gear 19 may in this instance drive gear 37 by virtue of the driving connection provided by idler gear 28 assuming that the sum of the backlash between gears 19 and 28 and between gears 28 and 37 is less than the sum of the backlash between gears 19 and 27 and between gears 27 and 37. If the sum is greater than the latter sum, then the output gear 37 will be driven by virtue of the driving connection provided by idler 27. It is thus seen that only one geared path is available for the delivery of power from the input shaft 3 to the power output gear 37.

If it is now assumed that the input bevel gear 19 is mounted to provide for floating movement as herein described, compensation for the difference in the sum of the backlash between the gears of the respective geared paths will take place. The power input bevel gear 19 will float until a driving engagement with the power output gear 37 is provided by each idler gear 27 and 28. Thus, two geared paths for the delivery of power are produced and the gear loads are accordingly reduced to approximately half the value of the gear loads which would exist if only a single power path were used.

In addition to the above, the gear loads are evenly balanced and are situated so that they tend to cancel each other. The resulting bearing loads on each of the plurality of bearings herein described are therefore considerably reduced.

The free floating characteristic of the power input bevel gear 19 will also permit self positioning of the same and thereby prevent premature gear failure arising out of a zero backlash condition.

Figure 7:
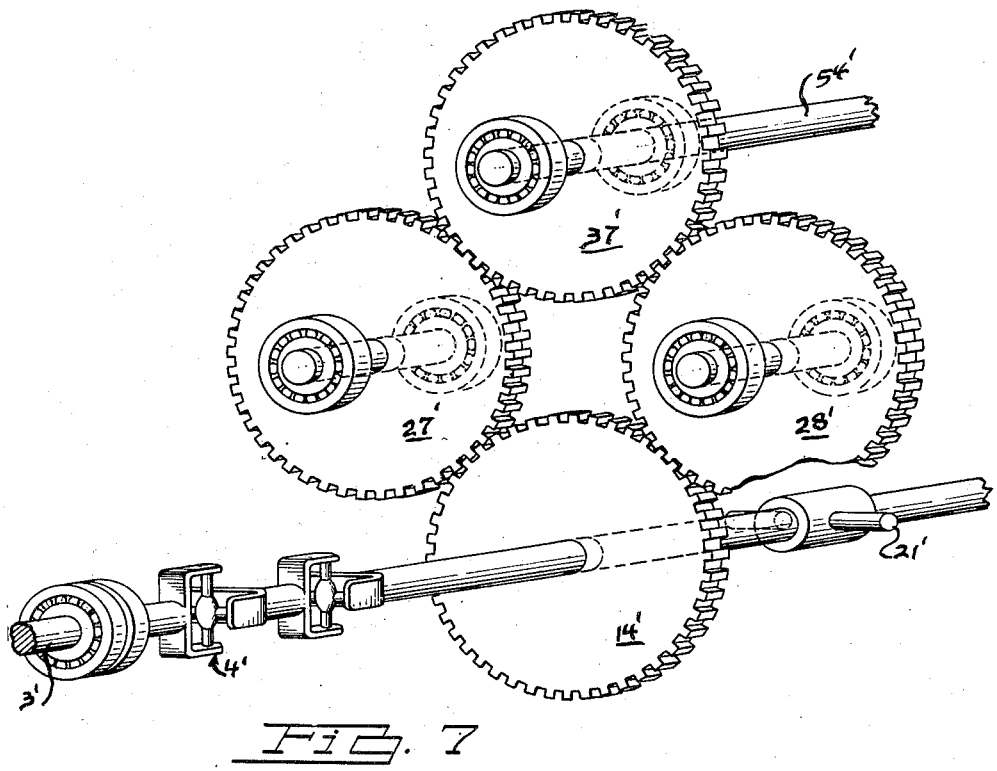
Figure 7 is a schematic representation of a second embodiment of my invention wherein the power output shaft and the power input shaft are in substantially parallel relationship.

Although the power output shaft and the power input shaft for the transmission herein described are coaxially disposed, I contemplate that they may also be mounted in spaced and substantially parallel relationship. In this latter instance, the two shafts may be drivably connected by suitable gearing which is adapted to provide more than one power flow path and which may comprise either spur or helical gear elements or the like. Such an embodiment is illustrated schematically in Figure 7 wherein a power input shaft 3' is drivably connected to a power input pinion 14' by means of a double universal joint 4'. The pinion 14' is capable of limited oscillation about a transverse axis represented by a bearing shaft 21'. The pinion 14' drivably engages idler pinions 27' and 28' which in turn are in driving engagement with power output gear 37', the latter being drivably connected to a power output shaft 54'. The gear 37' and the pinions 27' and 28' may each be suitably journaled for rotation about their respective axes as illustrated.

What I claim and desire to secure by United States Letters Patent is:

1. In a power transmission for delivering power from a driving means to a driven means, a power input gear, a universal coupling means for drivably connecting said power input gear to said driving means, a power output gear drivably connected to said driven means, intermediate gears individually engaged with each of said power input and power output gears to form two power delivery geared paths, each of said gears having an axis of rotation, the axis of said intermediate gears being perpendicular to the axis of said power input and power output gears and means for mounting said power input gear to provide for limited displacement of the same in a direction which is substantially transverse to its axis of rotation thereby accommodating the simultaneous delivery of power from said driving means to said driven means through each of said geared paths.

2. In a power transmission, a power input driving means, a power output driven means, first and second power flow paths including gears drivably connecting said driving and said driven means, said paths including a common gear having an axis of rotation, each of said paths being adapted to simultaneously transfer power from said driving means to said driven means and each having the same number of gears, and means for rotatably mounting said common gear to provide for limited displacement of the same in a direction substantially transverse to its axis of rotation as driving torque is applied thereto thereby substantially equalizing the amount of power being delivered through each of said paths.

3. In a power transmission, a power input driving means, a power output driven means, a plurality of power flow paths including gears drivably connecting said driving and said driven means, said paths including a common gear having an axis of rotation, each of said paths being adapted to simultaneously transfer power from said driving means to said driven means and each having one idler gear, and means for rotatably mounting one of said gears to provide for limited displacement of the same in a direction substantially transverse to its axis of rotation thereby substantially equalizing the amount of power being delivered through each of said paths.

References Cited in the file of this patent

UNITED STATES PATENTS

| | | |
|---|---|---|
| 2,161,702 | Durig | June 6, 1939 |
| 2,513,217 | Tomlines | June 27, 1950 |
| 2,560,865 | Hindmarch | July 17, 1951 |

FOREIGN PATENTS

| | | |
|---|---|---|
| 633,971 | Great Britain | Dec. 30, 1949 |